United States Patent
Kasuya

(10) Patent No.: US 8,544,270 B2
(45) Date of Patent: Oct. 1, 2013

(54) WASTE HEAT RECOVERY SYSTEM OF INTERNAL COMBUSTION ENGINE

(75) Inventor: Junichiro Kasuya, Isesaki (JP)

(73) Assignee: Sanden Corporation, Gunma (JP)

( * ) Notice: Subject to any disclaimer, the term of this patent is extended or adjusted under 35 U.S.C. 154(b) by 212 days.

(21) Appl. No.: 13/125,089

(22) PCT Filed: Oct. 20, 2009

(86) PCT No.: PCT/JP2009/068309
§ 371 (c)(1),
(2), (4) Date: Apr. 20, 2011

(87) PCT Pub. No.: WO2010/047410
PCT Pub. Date: Apr. 29, 2010

(65) Prior Publication Data
US 2011/0192163 A1     Aug. 11, 2011

(30) Foreign Application Priority Data
Oct. 20, 2008 (JP) .................... 2008-269683

(51) Int. Cl.
*F01K 23/10* (2006.01)
*F01K 23/06* (2006.01)
*F25B 13/00* (2006.01)
*F25B 1/00* (2006.01)
*F02B 27/00* (2006.01)

(52) U.S. Cl.
USPC .............. 60/618; 60/670; 62/238.6; 62/324.3

(58) Field of Classification Search
USPC ............... 60/618, 604, 670; 62/324.3, 238.6
See application file for complete search history.

(56) References Cited

U.S. PATENT DOCUMENTS

| | | | | |
|---|---|---|---|---|
| 7,344,364 | B2 * | 3/2008 | Ogawa et al. | 418/55.1 |
| 7,418,824 | B2 * | 9/2008 | Uno et al. | 60/670 |
| 7,454,910 | B2 * | 11/2008 | Hamada et al. | 60/618 |

(Continued)

FOREIGN PATENT DOCUMENTS

| JP | 57-99222 | 6/1982 |
|---|---|---|
| JP | 59-138707 | 8/1984 |

(Continued)

OTHER PUBLICATIONS

Partial English translation of a Written Opinion of the International Search Authority issued in the corresponding International Application, Date of completion of this opinion Oct. 17, 2009.

*Primary Examiner* — Thai Ba Trieu
(74) *Attorney, Agent, or Firm* — Cozen O'Connor

(57) ABSTRACT

A waste heat recovery system of an internal combustion engine, in which regenerative energy transmitted to the internal combustion engine is increased with a simple mechanism. A controller of the waste heat recovery system of an internal combustion engine makes a determination as to whether it is necessary to increase the pressure of heat-transfer media in a heat exchanger, on the basis of the pressure detected by the high-pressure sensor. When it is necessary to increase the pressure in the heat exchanger, the controller causes a flow-rate regulating valve to start regulating the flow rate of the heat-transfer media while leaving the pump working. The controller causes the flow-rate regulating valve to continue the regulation at least until it is not necessary to increase the pressure in the heat exchanger, and then terminates the regulation.

19 Claims, 10 Drawing Sheets

(56) References Cited

U.S. PATENT DOCUMENTS

| | | |
|---|---|---|
| 7,690,213 B2 * | 4/2010 | Inaba ............................ 62/238.6 |
| 2004/0255586 A1 * | 12/2004 | Hamada et al. ................. 60/670 |
| 2005/0144949 A1 * | 7/2005 | Hamada et al. ................. 60/670 |
| 2005/0235670 A1 * | 10/2005 | Takeuchi et al. ............. 62/238.6 |
| 2005/0262858 A1 * | 12/2005 | Inaba et al. ..................... 62/190 |
| 2006/0026981 A1 * | 2/2006 | Inaba et al. .................. 62/238.6 |
| 2007/0227472 A1 * | 10/2007 | Takeuchi et al. ........... 123/41.19 |
| 2009/0031749 A1 * | 2/2009 | Nishikawa et al. .......... 62/324.3 |

FOREIGN PATENT DOCUMENTS

| | | |
|---|---|---|
| JP | 1-44526 | 9/1989 |
| JP | 2001-227616 | 8/2001 |
| JP | 2005-345084 | 12/2005 |
| JP | 2006-37760 | 2/2006 |
| JP | 2006-170185 | 6/2006 |
| JP | 2008-297961 | 12/2008 |
| JP | 2010229843 A * | 10/2010 |
| JP | 2011214480 A * | 10/2011 |
| WO | WO 2010029905 A1 * | 3/2010 |

\* cited by examiner

WASTE HEAT RECOVERY SYSTEM OF INTERNAL COMBUSTION ENGINE

RELATED APPLICATIONS

This is a U.S. National Phase Application under 35 USC §371 of International Application PCT/JP2009/068309 filed on Oct. 20, 2009.

This application claims the priority of Japanese Patent Application No. 2008-269683 filed Oct. 20, 2008, the entire content of which is hereby incorporated by reference.

TECHNICAL FIELD

The present invention relates to a waste heat recovery system of an internal combustion engine, and more specifically to a waste heat recovery system of an internal combustion engine, which is suitable to a vehicle.

BACKGROUND ART

A waste heat recovery system of an internal combustion engine has a Rankine cycle circuit. The Rankine cycle circuit includes a circulation path through which heat-transfer media are circulated. A pump, a heat exchanger, an expander and a condenser are interposed in the circulation path in the order named. In the heat exchanger, the heat-transfer media are heated by using the heat released from the internal combustion engine, and the heat-transfer media that have been heated are expanded within the expander. In this process, power is supplied through the rotary shaft of the expander, and is used as regenerative energy.

As to the heat engine disclosed in Patent Document 1, for example, the engine is aided by regenerative energy. To be specific, the rotary shaft of the expander and that of the engine are coupled together through a transmission and a clutch, and the rotation of the expander's rotary shaft is transmitted to the engine's rotary shaft at a predetermined transmission gear ratio. In the waste heat recovery system of the Rankine engine and that of the internal combustion engine disclosed in Patent Documents 2 and 3, respectively, the expander's rotary shaft and the generator's rotary shaft are coupled together, and regenerative energy is converted into electric power by the generator.

Patent Documents 2 and 3 provide working-medium blocking means and a valve system, respectively, in the upstream of their respective expanders. More specifically, in the Rankine engine of Patent Document 2, bypass blocking means is placed side by side with the working-medium blocking means. At the time of starting the Rankine engine, the working-medium blocking means is first opened. The bypass blocking means is not opened until a differential pressure between the expander's inlet and outlet becomes equal to or higher than a preset value. When the Rankine engine is to be stopped, the bypass blocking means is first opened, and then, the working-medium blocking means is closed at the time point when the differential pressure between the expander's inlet and outlet becomes equal to or lower than the preset value. This is supposed to make it possible to achieve safe start and stop operations.

The waste heat recovery system of an internal combustion engine described in Patent Document 3 determines that there is an abnormality whenever a control signal of the generator strays from a target control zone. In such a case, a liquid pump is halted, and only predetermined switching devices are turned on. The valve system is then closed, which completely stops the influx of working fluid into the expander. On this account, it is considered that the expander and the generator can be stopped even if the rotation control of the generator becomes impossible.

Patent Document 1: Kokai No. 57-99222 (FIG. 1, for example)
Patent Document 2: Kokai No. 59-138707 (page 3, upper left column to lower left column and FIGS. 4 to 6, for example)
Patent Document 3: Kokai No. 2006-170185 (FIG. 1 and Pars. 0093 to 0096, for example)

DISCLOSURE OF THE INVENTION

Problems to be Solved by the Invention

In the heat engine of Patent Document 1, the rotary shaft of the expander (expander shaft) and the rotary shaft of the engine (engine shaft) are coupled together with a transmission intervening therebetween. If the transmission gear ratio is fixed, the rotational velocity of the expander shaft is increased as that of the engine shaft is increased. There is a limit to the amount of heat that can be absorbed by heat-transfer media within a heat exchanger, or an evaporator. The amount of evaporation of the heat-transfer media is therefore not sufficiently increased even if the rotational velocity of the expander shaft is increased. For that reason, the increase of the rotational velocity of the expander shaft reduces the pressure of the heat-transfer media within the evaporator. Consequently, the pressure of the heat-transfer media at the inlet of the expander is reduced, and this results in a decrease in output from the expander shaft, namely, regenerative energy amount.

If a multistage transmission or a continuous variable transmission is utilized instead of the above-mentioned transmission in order to prevent a change in rotational velocity of the expander, a complex system structure is required. In the waste heat recovery system of the Rankine engine and that of the internal combustion engine disclosed in Patent Documents 2 and 3, the engine and the expander of the Rankine cycle circuit are not coupled together, so that there is no problem like the one described above.

In the Rankine engine of Patent Document 2, the bypass blocking means is controlled in its opening and closing operations by differential pressure between the inlet and outlet of a compressor, but the working-medium blocking means is merely operated in conjunction with the activation and deactivation of the Rankine engine. In the waste heat recovery system of Patent Document 3, the valve system is only closed to stop the expander in the case where there is an abnormality.

The present invention has been made in light of problems disclosed by none of Patent Documents 1 to 3, and it is an object of the invention to provide a waste heat recovery system of an internal combustion engine, in which a regenerative energy amount transmitted to an internal combustion engine is increased by using a simple mechanism.

Means of Solving the Problems

In order to accomplish the above object, one aspect of the invention provides a waste heat recovery system of an internal combustion engine, having a Rankine cycle circuit provided with a pump, a heat exchanger that heats heat-transfer media by using heat generated in an internal combustion engine and thus adds superheat to the heat-transfer media, an expander, and a condenser, which are interposed in a circulation path of the heat-transfer media; power-transmitting means that transmits the power of a rotary shaft of the expander to a rotary shaft of the internal combustion engine; a flow-rate regulating valve that is interposed in an expander upstream section of the circulation path, which extends between the heat exchanger and an inlet of the expander, and is capable of regulating a flow rate of the heat-transfer media in the expander upstream section; a high-pressure sensor that detects pressure of the heat-transfer media within the heat exchanger; and a controller that controls the operation of the pump and the flow-rate regulating valve. The controller has at least determination means that makes a determination as to whether it is necessary to increase the pressure of the heat-transfer media in the heat exchanger, on the basis of the pressure detected by the high-pressure sensor. When the determination means determines that it is necessary to increase the pressure of the heat-transfer media in the heat exchanger, the flow-rate regulating valve is activated to start regulating the flow rate of the heat-transfer media while the pump remains working. The flow-rate regulating valve is made to continue to regulate the flow rate of the heat-transfer media at least until the determination means determines that it is not necessary to increase the pressure of the heat-transfer media in the heat exchanger, and then the regulation is terminated.

Preferably, the determination means determines that it is necessary to increase the pressure of the heat-transfer media in the heat exchanger when the pressure detected by the high-pressure sensor is lower than a lower limit pressure, and determines that it is not necessary to increase the pressure of the heat-transfer media in the heat exchanger when the pressure detected by the high-pressure sensor is higher than an upper limit pressure.

Preferably, the waste heat recovery system further includes a low-pressure sensor that detects the pressure of the heat-transfer media at an outlet of the expander. If a ratio of the pressure detected by the high-pressure sensor to the pressure detected by the low-pressure sensor is a pressure ratio, the determination means determines that it is necessary to increase the pressure of the heat-transfer media in the heat exchanger when the pressure ratio is lower than a lower limit pressure ratio, and determines that it is not necessary to increase the pressure of the heat-transfer media in the heat exchanger when the pressure ratio is higher than an upper limit pressure ratio.

Preferably, the waste heat recovery system further includes rotational-velocity detecting means that detects a rotational velocity of the rotary shaft of the expander, and the determination means makes a determination as to whether it is necessary to increase the pressure of the heat-transfer media in the heat exchanger only if the rotational velocity detected by the rotational-velocity detecting means is equal to or higher than a preset rotational velocity.

Preferably, the waste heat recovery system is further provided in a section of the circulation path, which extends between the heat exchanger and the flow-rate regulating valve, with a tank storing the heat-transfer media so that the heat-transfer media are freely movable in and out of the tank.

Preferably, the waste heat recovery system includes an evaporator as the heat exchanger which heats the heat-transfer media by using coolant of the internal combustion engine; and a superheater that is located downstream from the evaporator as viewed into a flowing direction of the heat-transfer media and heats the heat-transfer media by using an exhaust gas of the internal combustion engine. The tank and the superheater are formed integrally with each other.

Preferably, the waste heat recovery system further includes a second controller that controls output of the internal combustion engine. The second controller reduces the output when the controller terminates the regulation by the flow-rate regulating valve on the flow rate of the heat-transfer media.

Preferably, the flow-rate regulating valve is a flow-rate adjusting valve that is capable of varying the flow rate in a continuous way. When terminating the regulation by the flow-rate regulating valve on the flow rate of the heat-transfer media, the controller activates the flow-rate adjusting valve so that the flow rate is continuously increased.

Preferably, the waste heat recovery system includes a plurality of on-off valves as the flow-rate regulating valve, which are arranged in the circulation path in parallel with one another. When terminating the regulation by the flow-rate regulating valve on the flow rate of the heat-transfer media, the controller activates the on-off valves sequentially so that the flow rate is increased by stages.

Preferably, the controller prevents the flow-rate regulating valve from regulating the flow rate of the heat-transfer media for a predetermined period of time after activating the pump.

Preferably, the waste heat recovery system further includes bypass means that bypasses the flow-rate regulating valve.

Preferably, the power-transmitting means includes a one-way clutch that transmits power only in a direction from the rotary shaft of the expander toward the rotary shaft of the internal combustion engine.

Preferably, the power-transmitting means includes an electromagnetic clutch that disconnectably couples the rotary shaft of the expander and the rotary shaft of the internal combustion engine to each other. The controller releases the coupling between the rotary shaft of the expander and the rotary shaft of the internal combustion engine, which is made by the electromagnetic clutch, while causing the flow-rate regulating valve to regulate the flow rate of the heat-transfer media.

Preferably, once the regulation by the flow-rate regulating valve on the flow rate of the heat-transfer media is started, the controller continues the regulation while the internal combustion engine is exerting a braking force.

Preferably, a discharge amount of the pump is variable. While the flow-rate regulating valve is regulating the flow rate of the heat-transfer media, the controller sets to zero or reduces the discharge amount of the pump.

Preferably, the power-transmitting means includes a flywheel. Preferably, the power-transmitting means includes a hydraulic power unit that converts the power of the rotary shaft of the expander into hydraulic pressure and uses the hydraulic pressure to rotate the rotary shaft of the internal combustion engine.

Preferably, the hydraulic power unit includes a hydraulic pump that increases the hydraulic pressure by using the power of the rotary shaft of the expander; a hydraulic accumulator storing the hydraulic pressure; and a hydraulic motor that rotates the rotary shaft of the internal combustion engine by using the hydraulic pressure stored in the hydraulic accumulator. While the internal combustion engine is exerting a braking force, the hydraulic power unit provides the internal combustion engine with load required to exert the braking force and simultaneously increases the hydraulic pressure stored in the hydraulic accumulator by the hydraulic motor.

Preferably, the waste heat recovery system includes a fan that is controlled by the controller to refrigerate the condenser. The controller stops the fan at the time of causing the flow-rate regulating valve to regulate the flow rate of the heat-transfer media.

Advantageous Effects of the Invention

According to one embodiment of the invention, when the determination means determines that it is necessary to increase the pressure of the heat-transfer media in the heat exchanger, the controller increases the pressure of the heat-transfer media in the heat exchanger by using the flow-rate regulating valve. This prevents a decrease in pressure of the heat-transfer media at the expander inlet, and thus prevents a decrease in output of the expander, or a reduction in regenerative energy amount.

According to a further embodiment of the invention, the determination means makes a proper determination by using preset pressure as a criterion for determination.

According to a further embodiment of the invention, since the determination means uses the preset pressure ratio as a criterion, it is properly determined whether or not the pressure of the heat-transfer media in the heat exchanger needs to be increased.

According to a further embodiment of the invention, the determination means makes a determination only if the rotational velocity of the rotary shaft of the expander is equal to or higher than the preset rotational velocity, and the regenerative energy amount is reliably prevented from being reduced by the increase of the rotational velocity.

According to a further embodiment of the invention, the frequency of the flow rate regulation by the flow-rate regulating valve is reduced due to the tank. The flow rate regulation induces a temporary decrease in output of the expander, causing a disturbance to control on the speed of the internal combustion engine. The control on the internal combustion engine speed is stabilized by reducing the frequency of the flow rate regulation. In the case of a vehicle, the stable engine speed control makes a driver feel comfortable driving the vehicle. In addition, the reduction of frequency of the flow rate regulation contributes to prolongation of life of the flow-rate regulating valve.

According to a further embodiment of the invention, the heat-transfer media are increased in enthalpy by being heated within the tank. As a result, when the regulation by the flow-rate regulating valve is eliminated, the expander output is further amplified.

According to a further embodiment of the invention, engine output is reduced at the time of termination of the regulation by the flow-rate regulating valve on the flow rate of the heat-transfer media, so that the internal combustion engine speed is stabilized.

According to a further embodiment of the, the internal combustion engine speed is stabilized by increasing the flow rate in a continuous way at the time of termination of the regulation by the flow-rate regulating valve on the flow rate of the heat-transfer media. Since the rotational velocity of the rotary shaft of the expander is prevented from being drastically increased, load on the expander is reduced.

According to a further embodiment of the invention, the internal combustion engine speed is stabilized by increasing the flow rate by stages at the time of termination of the regulation by the flow-rate regulating valve on the flow rate of the heat-transfer media. Since the rotational velocity of the rotary shaft of the expander is prevented from being drastically increased, the load on the expander is reduced.

According to a further embodiment of the invention, even if the heat-transfer media are dispersed within the circulation path at the time point when the pump is activated, the heat-transfer media are caused to flow into the pump through the expander and thus promptly circulate through the circulation path. In short, time required from the pump activation to the waste heat recovery is reduced.

According to a further embodiment of the invention, the regulation on the flow rate of the heat-transfer media is relaxed due to the bypass means, resulting in stabilization of the internal combustion engine speed and in reduction of time from the pump activation to the waste heat recovery.

According to a further embodiment of the invention, the expander is prevented from becoming load on the internal combustion engine when the flow rate is regulated by the flow-rate regulating valve.

According to a further embodiment of the invention, the expander is prevented from becoming load on the internal combustion engine when the flow rate is regulated by the flow-rate regulating valve.

According to a further embodiment of the invention, the regulation by the flow-rate regulating valve on the flow rate of the heat-transfer media is conducted while the internal combustion engine is exerting a braking force. In result, the expander does not aid the internal combustion engine, and the braking force of the internal combustion engine is then prevented from being decreased. If the expander becomes load, the braking force of the internal combustion engine is increased. If the regulation on the flow rate is continued, the pressure of the heat-transfer media in the heat exchanger is further increased, thereby amplifying the expander output after the regulation is eliminated.

According to a further embodiment of the invention, the discharge amount of the pump is decreased while the flow-rate regulating valve is regulating the flow rate of the heat-transfer media. A consumption power of the pump is thus reduced while the heat-transfer media are fully heated within the heat exchanger.

According to a further embodiment of the invention, the power transmitted to the rotary shaft of the internal combustion engine is averaged due to the flywheel, and the internal combustion engine speed is thus stabilized.

According to a further embodiment of the invention, the power transmitted to the rotary shaft of the internal combustion engine is averaged due to the hydraulic power unit, and the internal combustion engine speed is stabilized.

According to a further embodiment of the invention, the regenerative energy amount is further increased by storing the hydraulic pressure by means of the hydraulic motor while the internal combustion engine is exerting a braking force.

According to a further embodiment of the invention, the regenerative energy amount is further increased by stopping the fan.

REFERENCE MARKS 100 internal combustion engine
304 heat-medium pump (pump)
308 second heat exchanger (heat exchanger)
310 third heat exchanger (heat exchanger)
312 expander
500 R/C controller (controller)
502 pressure gauge (high-pressure sensor)
506 electromagnetic on-off valve (flow-rate regulating valve)

BEST MODES FOR CARRYING OUT THE INVENTION

Modes for carrying out the invention will be described below in detail with reference to the attached drawings.

EMBODIMENT 1

Figure 1:
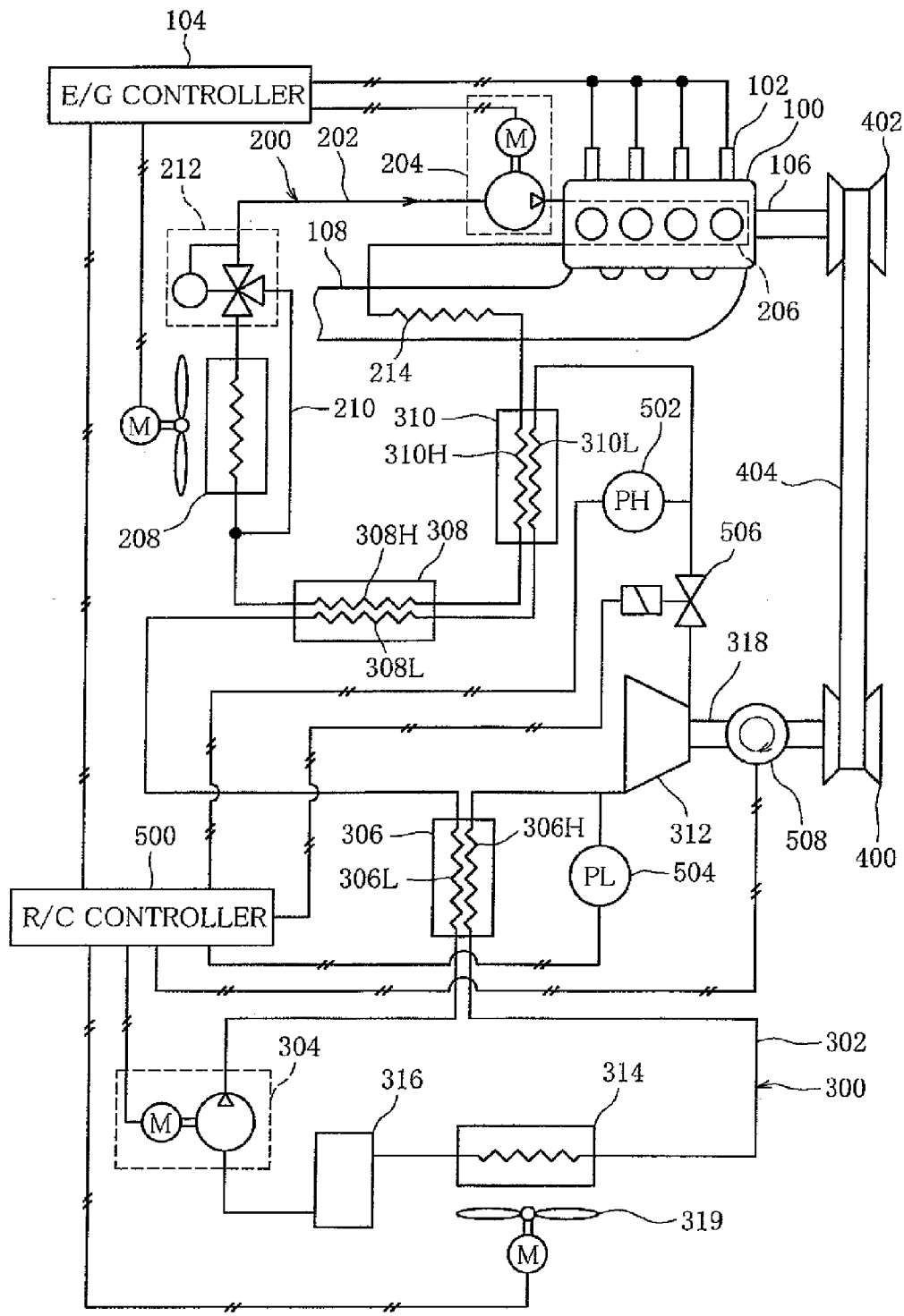
FIG. 1 is a view schematically showing a waste heat recovery system of an internal combustion engine according to one embodiment of the invention.

FIG. 1 shows a schematic configuration of a waste heat recovery system of an internal combustion engine 100 according to one embodiment of the invention.

The waste heat recovery system of the internal combustion engine 100 is designed to convert into energy (regenerative energy) the heat generated in the internal combustion engine 100. More specifically, the heat generated in the internal combustion engine 100 is supplied through a cooling device 200 of the internal combustion engine 100 to a Rankine cycle circuit 300. The heat is then converted into torque in the Rankine cycle circuit 300. The torque is transmitted to the internal combustion engine 100 and aids the internal combustion engine 100.

The internal combustion engine 100 is, for example, a diesel engine for a vehicle. Diesel oil as fuel is supplied into cylinders of the internal combustion engine 100 through injectors 102. The injectors 102 are controlled by an E/G controller 104. An applied amount of an accelerator pedal, not shown, is inputted to the E/G controller 104. On the basis of the applied amount of the accelerator pedal, the E/G controller 104 adjusts a fuel supply amount. Needless to say, as the applied amount is increased, the fuel supply amount is raised, and a rotational velocity of a rotary shaft 106 of the internal combustion engine 100 (internal combustion engine speed) is increased.

Although not shown, the rotary shaft 106 of the internal combustion engine 100 is coupled to wheels via a clutch and a transmission. Exhaust gas generated in the internal combustion engine 100 is discharged out of a vehicle through an exhaust pipe 108 connected to the internal combustion engine 100. The cooling device 200 is set in the vehicle to prevent the internal combustion engine 100 from being heated. To be specific, the cooling device 200 has a water circulation path 202 through which coolant is circulated. A water pump 204, an internal water channel 206 of the internal combustion engine 100, and a radiator 208 are interposed in the water circulation path 202 in the order named in a flowing direction of the coolant. The cooling device 200 further has a bypass 210 that bypasses the radiator 208. The bypass 210 has a downstream end that is connected to the water circulation path 202 via a three-way valve 212. The three-way valve 212 functions as a thermostat and operates to make the coolant flow through the bypass 210 when the temperature of the coolant is equal to or lower than predetermined temperature.

The Rankine cycle circuit 300 has a heat-medium circulation path 302 through which heat-transfer media (heat media) serving as working fluid are circulated. As the heat medium, it is possible to use, for example, a fluorocarbon refrigerant (R-134a, R-152a, R-1234yf, R-245fa), hydrocarbon, alcohol or the like. In the heat-medium circulation path 302, there are interposed a heat-medium pump 304, a low-temperature section 306L of a first heat exchanger 306, a low-temperature section 308L of a second heat exchanger 308, a low-temperature section 310L of a third heat exchanger 310, an expander 312, a high-temperature section 306H of the first heat exchanger 306, a condenser 314, and a gas-liquid separator, in the order named in a flowing direction of the heat media.

The first heat exchanger 306 is also called a regenerator. Heat exchange is carried out between the high-temperature section 306H and the low-temperature section 306L of the first heat exchanger 306. That is to say, in the first heat exchanger 306, the heat media discharged from the heat-medium pump 304 are heated by the heat media expanded in the expander 312. The second heat exchanger 308 is also called an evaporator. Heat exchange is carried out between the high-temperature section 308H and the low-temperature section 308L of the second heat exchanger 308. The second heat exchanger 308 uses the heat generated in the internal combustion engine 100 to heat and evaporate the heat media. To that end, the high-temperature section 308H of the second heat exchanger 308 is interposed in the water circulation path 202.

The third heat exchanger 310 is also called a superheater. Heat exchange is carried out between the high-temperature section 310H and the low-temperature section 310L of the third heat exchanger 310. The third heat exchanger 310 uses the heat generated in the internal combustion engine 100 to heat the heat media, and adds superheat to the heat media. To that end, the high-temperature section 310H of the third heat exchanger 310 is interposed in the water circulation path 202. For the purpose of more effective use of the heat generated in the internal combustion engine 100, a heater 214 is interposed in the water circulation path 202. The heater 214 is set in the exhaust pipe 108 and heats the coolant by using the heat of exhaust gas. The heater 214, the high-temperature section 310H of the third heat exchanger 310, and the high-temperature section 308H of the second heat exchanger 308 are interposed in a section of the water circulation path 202, which extends between the internal water channel 206 and the radiator 208, in the order named in a flowing direction of the coolant.

The expander 312 expands the heat media and thus converts into power the heat that the heat media obtains in the second and third heat exchangers 308 and 310. The power is outputted by a rotary shaft 318 of the expander 312 and transmitted to the rotary shaft 106 of the internal combustion engine 100 by power-transmitting means. Where suction volume of the expander 312 is Vs; discharge volume is Ve; inlet pressure is Ps; outlet pressure is Pe; and a specific heat ratio of the heat media is γ, if expansion is an ideal adiabatic expansion, $(Ps/Pe)=(Ve/Vs)^\gamma$ is true according to the Poisson's law.

As the power-transmitting means, for example, pulleys 400 and 402 and a belt 404 may be used. The pulleys 400 and 402 are fixed to the rotary shafts 318 and 106. The belt 404 is hung around the pulleys 400 and 402. The waste heat recovery system of the internal combustion engine 100 controls the Rankine cycle circuit 300.

The waste heat recovery system of the internal combustion engine 100 has a controller (R/C controller) 500. The R/C controller 500 may be configured, for example, of an ECU (electrical control unit). The R/C controller 500 controls the activation and deactivation of the heat-medium pump 304 and of a fan 319 for the condenser 314, thereby controlling the activation and deactivation of the Rankine cycle circuit 300. The R/C controller 500 has determination means that makes a determination as to whether it is necessary during the operation of the heat-medium pump 304 to increase the pressure of the heat media at the outlet of the low-temperature section 310L of the third heat exchanger 310, that is, the pressure of the heat media in the second and third heat exchangers 308 and 310 (evaporating pressure). The waste heat recovery system of the internal combustion engine 100 includes a sensor that provides the determination means with information needed for determinations and a flow-rate regulating valve that operates according to a result of determination of the determination means.

More specifically, for example, two pressure gauges 502 and 504 may be utilized as the sensor. The pressure gauge 502 is fixed to a section of the heat-medium circulation path 302 (hereinafter, also referred to as an expander upstream section), which extends between the outlet of the low-temperature section 310L of the third heat exchanger 310 and the inlet of the expander 312, and detects the pressure of the heat media in the expander upstream section. To detect the above pressure is to detect the pressure of the heat media within the second and third heat exchangers 308 and 310 in the Rankine cycle circuit 300, namely, high-pressure pressure PH, and is also practically to detect the pressure Ps at the inlet of the expander 312 when the electromagnetic on-off valve 506 is opened.

The pressure gauge 504 is fixed to a section of the heat-medium circulation path 302, which extends between the outlet of the expander 312 and the condenser 314, and detects the pressure of the heat media in the section. To detect the above pressure is to detect low-pressure pressure PL of the Rankine cycle circuit 300 and to detect the pressure Pe of the heat media at the outlet of the expander 312. The high-pressure pressure PH and the low-pressure pressure PL, which are detected by the pressure gauges 502 and 504, respectively, are inputted to the R/C controller 500. The determination means of the R/C controller 500 calculates a ratio of the high-pressure pressure PH to the low-pressure pressure PL, PH/PL (hereinafter, referred to as pressure ratio Rc). The determination means then compares the calculated pressure ratio Rc with a preset lower limit pressure ratio Rmin and a preset upper limit pressure ratio Rmax. The determination means determines that the high-pressure pressure PH needs to be increased (YES determination) when the pressure ratio Rc is lower than the lower limit pressure ratio Rmin, and determines that the high-pressure pressure PH does not need to be increased (NO determination) when the pressure ratio Rc is higher than the upper limit pressure ratio Rmax.

As the flow-rate regulating valve, for example, the electromagnetic on-off valve 506 that is a 2-port 2-position switching valve may be used. The electromagnetic on-off valve 506 is interposed in an expander upstream section of the heat-medium circulation path 302, and is capable of opening and closing the section. The electromagnetic on-off valve 506 is positioned downstream from the pressure gauge 502 in the flowing direction of the heat media. The on-off operations of the electromagnetic on-off valve 506 are controlled by the R/C controller 500. The R/C controller 500 closes the electromagnetic on-off valve 506 when the determination means determines YES. Once closing the electromagnetic on-off valve 506, the R/C controller 500 continues to close the electromagnetic on-off valve 506 at least until the determination means determines NO, and then opens the electromagnetic on-off valve 506. In the present embodiment, for example, when the determination means determines NO, the R/C controller 500 opens the electromagnetic on-off valve 506.

Once the R/C controller 500 closes the electromagnetic on-off valve 506, the heat-medium pump 304 is kept in operation until the electromagnetic on-off valve 506 is opened. Preferably, the waste heat recovery system of the internal combustion engine 100 has a rotational velocity meter 508 that detects the rotational velocity of the rotary shaft 318 of the expander 312 (expander rotational velocity). The expander rotational velocity detected by the rotational velocity meter 508 is inputted to the R/C controller 500. The R/C controller 500 preferably does not make any determination using the determination means when the expander rotational velocity is lower than a preset minimum rotational velocity Vmin. To put it differently, the R/C controller 500 preferably does not perform the flow rate regulation of the heat media using the electromagnetic on-off valve 506 when the expander rotational velocity is lower than the preset minimum rotational velocity Vmin.

A use method (operation) of the waste heat recovery system of the internal combustion engine 100 will be described below. When an operator gives a command to start the internal combustion engine 100, the E/G controller 104 starts the internal combustion engine 100 and activates the water pump 204. As a result, circulating water is heated when passing through the internal water channel 206 of the internal combustion engine 100, and is further heated when passing through the heater 214.

The R/C controller 500 activates the heat-medium pump 304 simultaneously with or after the activation of the water pump 204. The heat-medium pump 304 then sucks in low-temperature and low-pressure heat media, and discharges low-temperature and high-pressure heat media. The discharged heat media is preliminarily heated by the first heat exchanger 306. The heat media are then heated by the second heat exchanger 308 to be evaporated, and heated by the third heat exchanger 310 into high-temperature and high-pressure gas phase heat media having superheat. High-temperature and high-pressure gas phase refrigerants are expanded by the expander 312 into high-temperature and low-pressure gas phase heat media.

The high-temperature and low-pressure gas phase heat media are refrigerated firstly by the first heat exchanger 306 and then by the condenser 314 to be condensed into low-temperature and low-pressure liquid phase heat media. The low-temperature and low-pressure liquid phase heat media are sucked into the heat-medium pump 304 through a gas-liquid separator 316. The heat media work outward when passing through the expander 312, and this work is outputted as torque through the rotary shaft 318. The torque of the expander 312 is transmitted through the power-transmitting means to the rotary shaft 106 of the internal combustion engine 100.

According to the waste heat recovery system of the internal combustion engine 100, during a normal operation of the system, the heat generated in the internal combustion engine 100 is converted into regenerative energy by the Rankine cycle circuit 300. The regenerative energy aids the operation of the internal combustion engine 100. According to the waste heat recovery system of the internal combustion engine 100, during the normal operation of the system, the determination means repeatedly makes determinations as to whether it is necessary to increase the high-pressure pressure PH at predetermined intervals in consideration of prevention of a reduction in regenerative energy amount. The R/C controller 500 closes the electromagnetic on-off valve 506 when the determination is YES, and thereafter opens the electromagnetic on-off valve 506 when the determination is NO.

With the above-described operations of the waste heat recovery system, even when the internal combustion engine speed is high, the high-pressure pressure PH is prevented from being decreased, and the inlet pressure Ps of the expander 312 is also prevented from being decreased. This consequently prevents a reduction in output of the expander 312, or a reduction in regenerative energy amount. In the waste heat recovery system, using the pressure ratio Re as a criterion for determination, the determination means makes a proper determination as to the necessity of increasing the high-pressure pressure PH. "Proper determination" means a determination that allows more regenerative energy to be produced.

Figure 2:
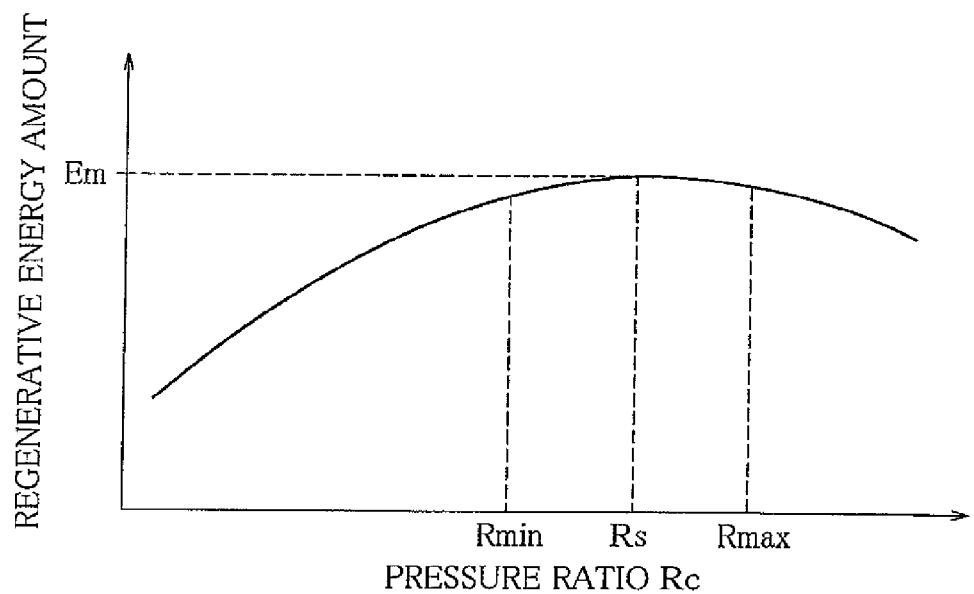
FIG. 2 is a graph showing relationship between a pressure ratio and a regenerative energy amount in the system of FIG. 1.

To be more precise, the regenerative energy amount is determined by the pressure ratio Rc as schematically shown in FIG. 2. When the pressure ratio Rc is an optimum value Rs, the regenerative energy amount is at a maximum value Em. For this reason, if the pressure ratio Rc is at the optimum value Rs or an value approximate thereto, it is possible to bring the regenerative energy amount to the maximum value Em or a value approximate thereto. In this view, the present embodiment sets the lower limit pressure ratio Rmin lower than the optimum value Rs and the upper limit pressure ratio Rmax higher than the optimum value Rs. The flow rate is regulated according to determination results so that the pressure ratio Rc falls in a range between the lower limit pressure ratio Rmin and the upper limit pressure ratio Rmax, which brings the regenerative energy amount to the maximum value Em or a value approximate thereto.

The optimum value Rs can be found through an experiment. Where $(Ve/Vs)\gamma$ is an ideal pressure ratio Ri, the optimum value Rs is roughly 1.15 to 1.20 times, and more specifically, approximately 1.18 times, as high as the ideal pressure ratio Ri. The lower limit pressure ratio Rmin is preferably set at a value that is about 90 percent as high as the optimum value Rs. For that reason, the lower limit pressure ratio Rmin is preferably set to be 1.03 to 1.08 times, and most preferably 1.06 times, as high as the ideal pressure ratio Ri.

Figure 3:
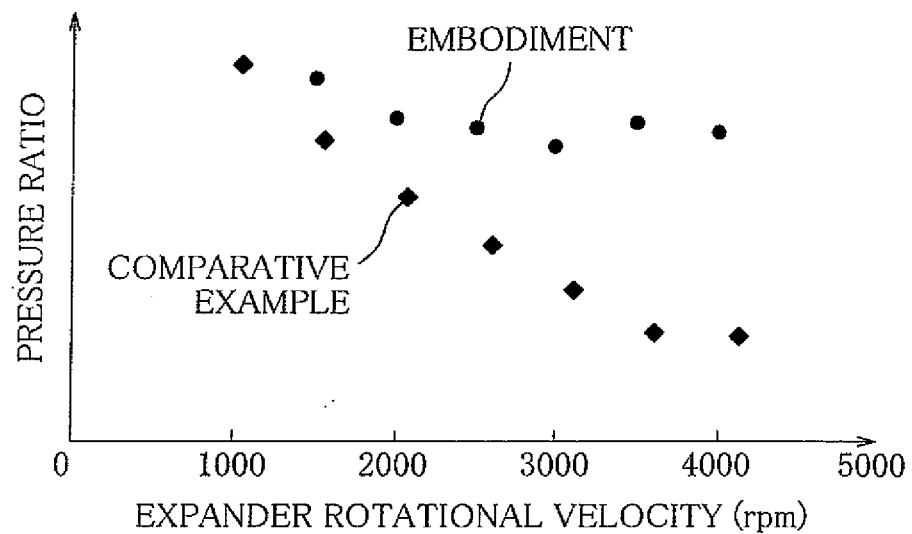
FIG. 3 is a graph showing relationship between an expander rotational velocity and the pressure ratio together with a comparative example in the system of FIG. 1.
Figure 4:
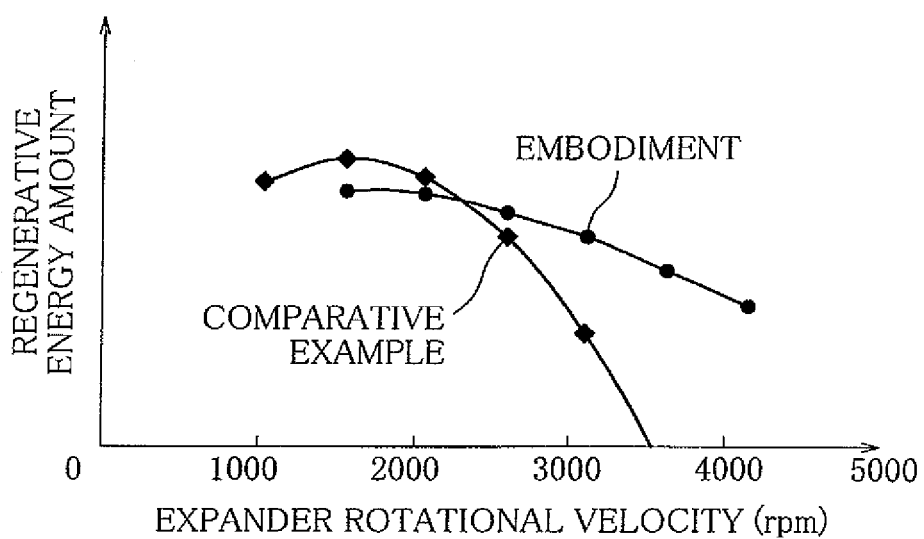
FIG. 4 is a graph showing relationship between the expander rotational velocity and the regenerative energy amount together with a comparative example in the system of FIG. 1.

The upper limit pressure ratio Rmax may be the same value as the lower limit pressure ratio Rmin, but is preferably set at a value that is about 110 percent as high as the optimum value Rs to keep the electromagnetic on-off valve 506 from being frequently opened and closed. A graph of FIG. 3 shows relationship between the expander rotational velocity and the pressure ratio Re. A graph of FIG. 4 shows relationship between the expander rotational velocity and the regenerative energy amount. In both FIGS. 3 and 4, embodiments show results obtained in the case where the flow rate regulation is conducted on the basis of determination results as described above, whereas comparative examples show results obtained in the case where the flow rate regulation is not conducted at all.

The pressure ratio Rc of the embodiment shown in FIG. 3 is an average value of the pressure ratio in a time period when the electromagnetic on-off valve 506 is opened. The regenerative energy amount shown in FIG. 4 is a value obtained by subtracting a consumption power of the heat-medium pump 304 and that of the fan 319 of the condenser 314 from the energy outputted by the expander 312. As is apparent from FIG. 3, the embodiment prevents the reduction of the pressure ratio Rc better than the comparative example in a zone where the expander rotational velocity is higher than 1500 rpm.

Referring to FIG. 4, in a rotational velocity zone that is above approximately 2250 rpm, the embodiment has higher regenerative energy amounts than the comparative example. In the embodiment, as a preferred aspect, the determination means makes a determination when the expander rotational velocity is equal to or higher than the minimum rotational velocity Vmin. In this view, it is clear from FIG. 4 that if the minimum rotational velocity Vmin is set, for example, at 2250 rpm in the embodiment, the regenerative energy amount can be reliably prevented from being reduced due to an increase in the expander rotational velocity.

Figure 5:
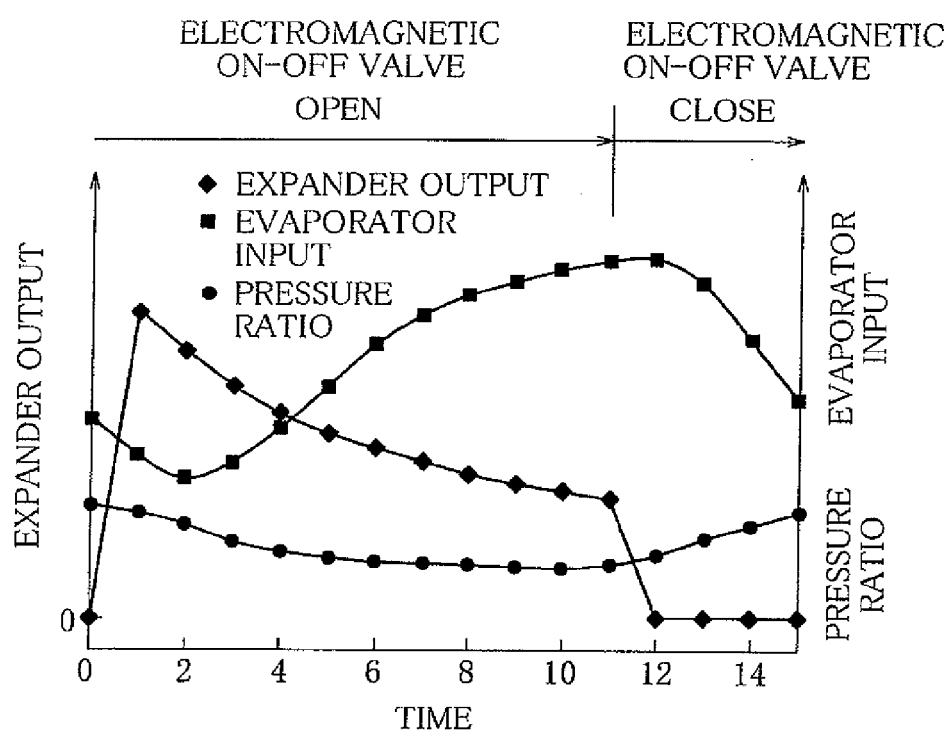
FIG. 5 is a graph showing temporal changes in expander output, pressure ratio and evaporator input in the system of FIG. 1.

FIG. 5 is a graph showing temporal changes in the output of the expander 312, the pressure ratio Rc and evaporator input in the embodiment when the expander rotational velocity is 3000 rpm. The time span shown in FIG. 5 is zero second to 15 seconds. Virtually the same results are repeatedly obtained every 15 seconds as one cycle. It is obvious from FIG. 5 that the electromagnetic on-off valve 506 is opened for a duration of 11 seconds, and then closed for a duration of 4 seconds. The pressure ratio Rc is gradually decreased immediately after the electromagnetic on-off valve 506 is opened, and starts increasing once the electromagnetic on-off valve 506 is closed. The output of the expander 312 is rapidly amplified immediately after the electromagnetic on-off valve 506 is opened, and then starts decreasing by degree. The output of the expander 312 is drastically decreased to zero once the electromagnetic on-off valve 506 is closed. The average of the expander outputs within a duration of 15 seconds shown in FIG. 5 is higher than that of the comparative example.

The evaporator input is a heat suction amount of the heat media in the second heat exchanger 308. The evaporator input starts increasing a short while after the electromagnetic on-off valve 506 is opened, and an increase rate thereof lowers 6 seconds later. The evaporator input then starts decreasing a short while after the electromagnetic on-off valve 506 is closed, and continues to decrease for a short while after the electromagnetic on-off valve 506 is opened. As a temperature difference between the coolant and the heat media in the second heat exchanger 308 grows larger, the evaporator input is increased. In FIG. 5, the lower the pressure ratio Rc is, the more the evaporator input increases. It is therefore obvious that the reduction of the pressure ratio Rc involves the decrease of the heat media's pressure and temperature in the second heat exchanger 308.

The invention is not limited to the one embodiment, and may be modified in various ways. In the one embodiment, the heat media discharged from the heat-medium pump 304 are heated by using the first heat exchanger 306. The first heat exchanger 306, however, may be omitted. Furthermore, as long as superheat can be added to the heat media by the second heat exchanger 308, the third heat exchanger 310 may be omitted. In short, the number of the heat exchangers may be either one or more than one as long as it is possible to heat the heat media by using the heat released from the internal combustion engine 100 and add superheat to the heat media.

Although the one embodiment determines, on the basis of the pressure ratio Rc, whether the high-pressure pressure PH needs to be increased, the determination means may make a determination at least on the basis of the high-pressure pressure PH.

For example, the determination means may make a determination on the basis of the high-pressure pressure PH only. In this case, when the high-pressure pressure PH is lower than the preset lower limit pressure, the determination means determines that the high-pressure pressure PH needs to be increased, and when the high-pressure pressure PH is higher than the preset upper limit pressure, the determination means determines that the high-pressure pressure PH does not need to be increased. In this case, too, determinations are properly made.

Another idea, for example, is to prepare map data showing relationship of the pressure ratio Rc, the expander rotational velocity, and the output of the expander 312 so that the determination means may make a determination on the basis of the map data. It is preferable in the one embodiment that the tank storing the heat media so that the heat-transfer media are freely movable in and out of the tank be placed in the expander upstream section of the heat-medium circulation path 302. The tank reduces the frequency of the flow rate regulation by the flow-rate regulating valve. The flow rate regulation induces a temporary decrease in the expander output, causing a disturbance to the control on the internal combustion engine speed. If the flow rate regulation is conducted less frequently, the internal combustion engine speed is stabilized. In the case of a vehicle, the stable engine speed makes a driver feel comfortable driving the vehicle. The reduction of frequency of the flow rate regulation contributes to prolongation of life of the flow-rate regulating valve.

Figure 6:
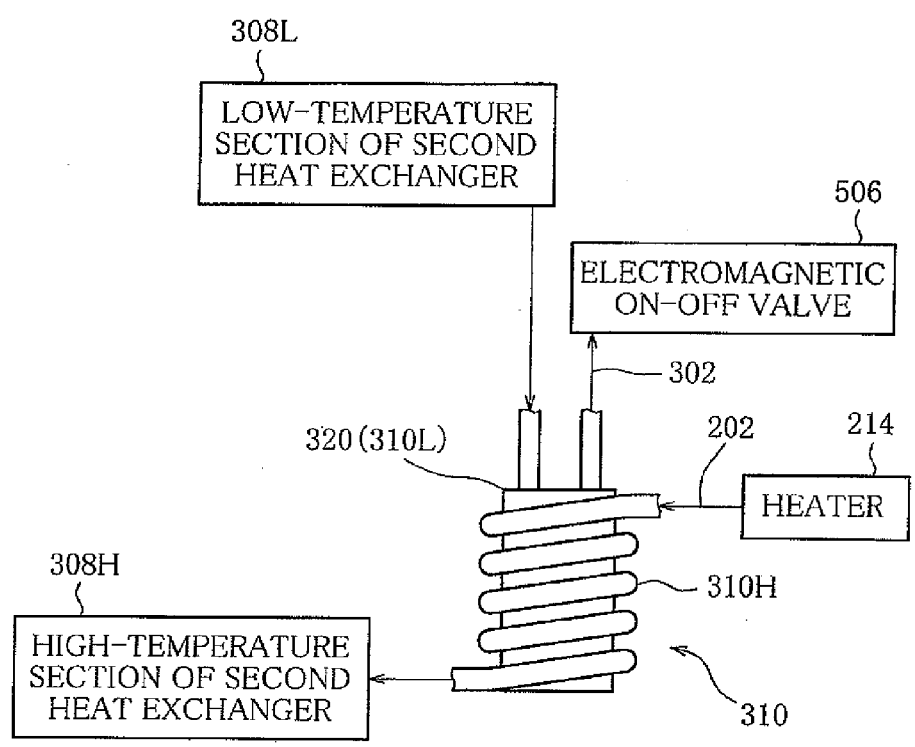
FIG. 6 is a schematic view of a third heat exchanger according to a modification example.

As the tank, a tank 320 as shown in FIG. 6 is preferably utilized. The tank 320 is formed integrally with the third heat exchanger 310 and configures the low-temperature section 310L of the third heat exchanger 310. Although the high-temperature section 310H is wound around the outside of the tank 320, the high-temperature section 310H may be placed inside the tank 320. In this case, if the high-temperature section 310H is heated within the tank 320, the enthalpy of the heat media is increased. When the regulation by the flow-rate regulating valve is eliminated, the output of the expander 312 is further amplified.

In the one embodiment, the amount of the fuel supplied to the internal combustion engine 100 is preferably reduced by the E/G controller 104 at the time of termination of the regulation by the flow-rate regulating valve on the flow rate of the heat-transfer media. In this case, if the output of the internal combustion engine itself is decreased in response to the amplification of the output of the expander 312 after the termination of the flow rate regulation, the internal combustion engine speed is stabilized. In the one embodiment, the flow rate of the heat-transfer media are preferably increased in a continuous way at the time of termination of the regulation by the flow-rate regulating valve on the flow rate of the heat-transfer media. This stabilizes the internal combustion engine speed. Moreover, the expander rotational velocity is prevented from being rapidly increased, so that load on the expander 100 is reduced.

Figure 7:
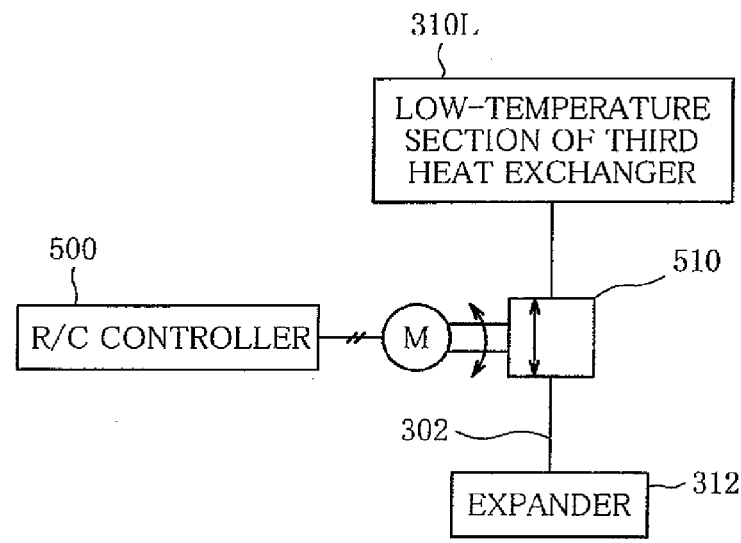
FIG. 7 is a schematic view of a flow-rate regulating valve according to a modification example.

To that end, for example, the opening degree of the electromagnetic on-off valve 506 may be continuously altered by conducting a duty-ratio control. In stead of using the electromagnetic on-off valve 506, a flow-rate adjusting valve 510 may be utilized as the flow-rate regulating valve, which is capable of varying the flow rate in a continuous way as shown in FIG. 7. If the flow rate cannot be continuously increased, it is preferable that the flow rate be increased by stages at the time of termination of the regulation by the flow-rate regulating valve on the flow rate of the heat-transfer media. In result, the internal combustion engine speed is stabilized. Since the rapid increase of the expander rotational velocity is prevented, the load on the expander 312 is reduced.

Figure 8:
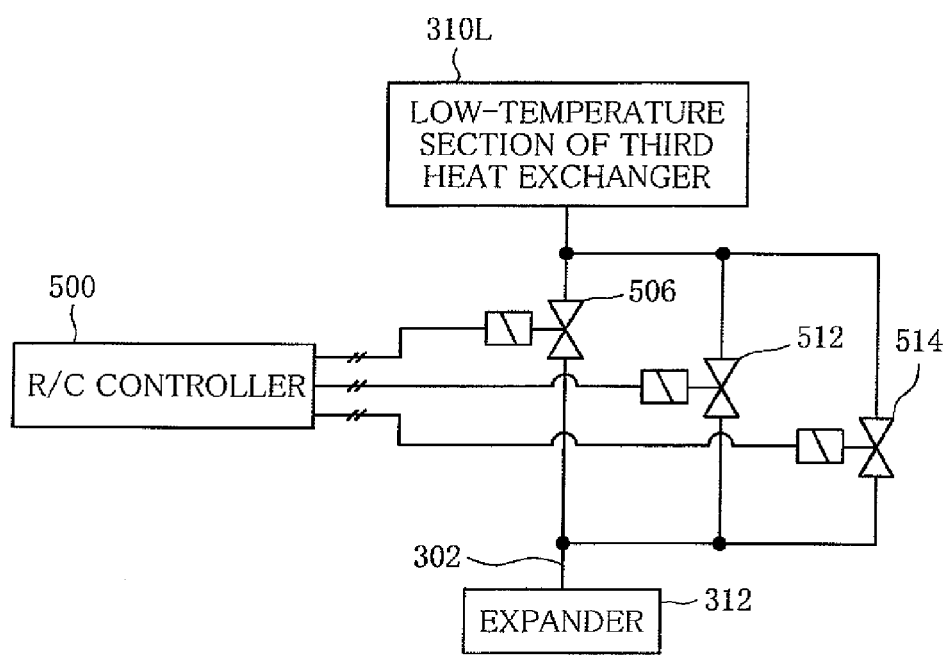
FIG. 8 is a schematic view of a flow-rate regulating valve according to a modification example.

For that purpose, for example, the opening degree of the electromagnetic on-off valve 506 may be altered by stages by conducting the duty ratio control. It is also possible to dispose the electromagnetic on-off valves 506, 512 and 514 in parallel with one another as shown in FIG. 8, and open the electromagnetic on-off valves 506, 512 and 514 one by one. Preferably, in the one embodiment, the flow-rate regulating valve is prevented from regulating the flow rate of the heat media for a predetermined period of time after the activation of the heat-medium pump 304. By so doing, even if the heat media are dispersed in the heat-medium circulation path 302 at the time of a cold start of the heat-medium pump 304, the heat media are caused to enter the heat-medium pump 304 via the expander 312, and promptly circulate through the heat-medium circulation path 302. To be short, the time required from the activation of the heat-medium pump 304 to the waste heat recovery is reduced.

Figure 9:
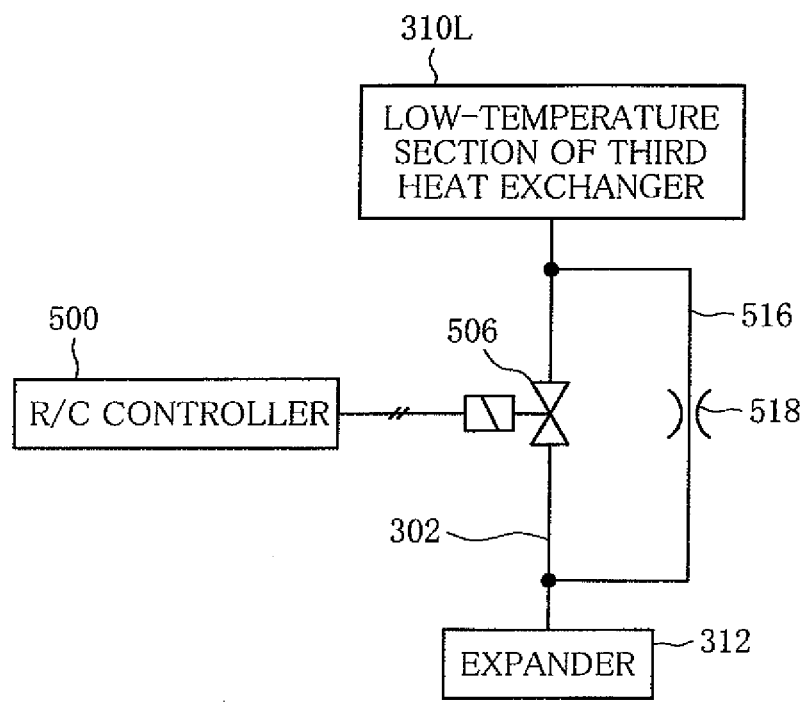
FIG. 9 is a schematic view of bypass means according to a modification example.

In the one embodiment, preferably, the bypass means that bypasses the flow-rate regulating valve is further provided. As shown in FIG. 9, for example, the bypass means may be formed of a bypass 516 bypassing the flow-rate regulating valve and a throttle 518 that reduces the flow rate of the bypass 516 to be lower than that of the circulation path 302. In this case, even if the flow rate of the heat media in the heat-medium circulation path 302 is regulated by the flow-rate regulating valve, the bypass means relaxes the flow rate regulation of the heat media. Consequently, the internal combustion engine speed is stabilized when the regulation by the flow-rate regulating valve is terminated, and the flow rate of the heat media is increased. Furthermore, even with the regulation by the flow-rate regulating valve, the heat media are constantly supplied by the bypass means to the heat-medium pump 304 via the expander 312, and this makes it possible to stably operate the waste heat recovery system.

Figure 10:
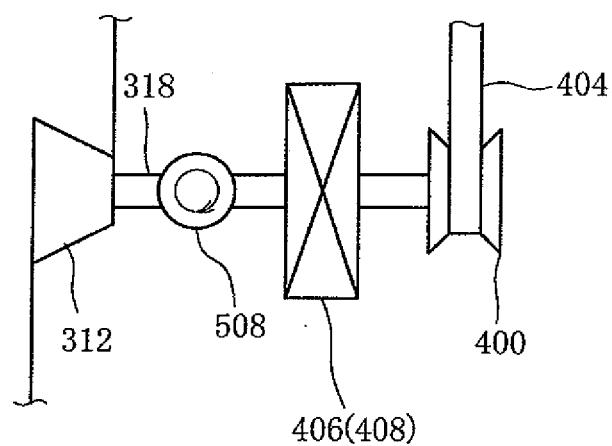
FIG. 10 is a schematic view of power-transmitting means according to a modification example.

In the one embodiment, the power-transmitting means preferably further includes a one-way clutch 406 as shown in FIG. 10. The one-way clutch 406 transmits torque only in a direction from the rotary shaft 318 of the expander 312 toward the rotary shaft 106 of the internal combustion engine 100. In this case, the expander 312 is prevented from being load on the internal combustion engine 100 while the flow-rate regulating valve is regulating the flow rate.

Alternatively, the power-transmitting means preferably includes an electromagnetic clutch 408. The electromagnetic clutch 408 is capable of disconnectably coupling the rotary shaft 318 of the expander 312 to the rotary shaft 106 of the internal combustion engine 100. In this case, the R/C controller 500 disconnects the rotary shaft 318 of the expander 312 and the rotary shaft 106 of the internal combustion engine 100 from each other while causing the flow-rate regulating valve to regulate the flow rate. This prevents the expander 312 from being load on the internal combustion engine 100, too.

In the one embodiment, after the flow-rate regulating valve starts regulating the flow rate of the heat media, the R/C controller 500 preferably continues the flow rate regulation while the internal combustion engine 100 is exerting the braking force. In this case, since the flow rate of the heat media is regulated by the flow-rate regulating valve while the internal combustion engine 100 is exerting the braking force, the expander does not aid the internal combustion engine, so that the braking force of the internal combustion engine is prevented from being reduced. Moreover, since the flow rate regulation is continued, the high-pressure pressure PH is further increased, and this amplifies the output of the expander 312 after the elimination of the regulation.

Figure 11:
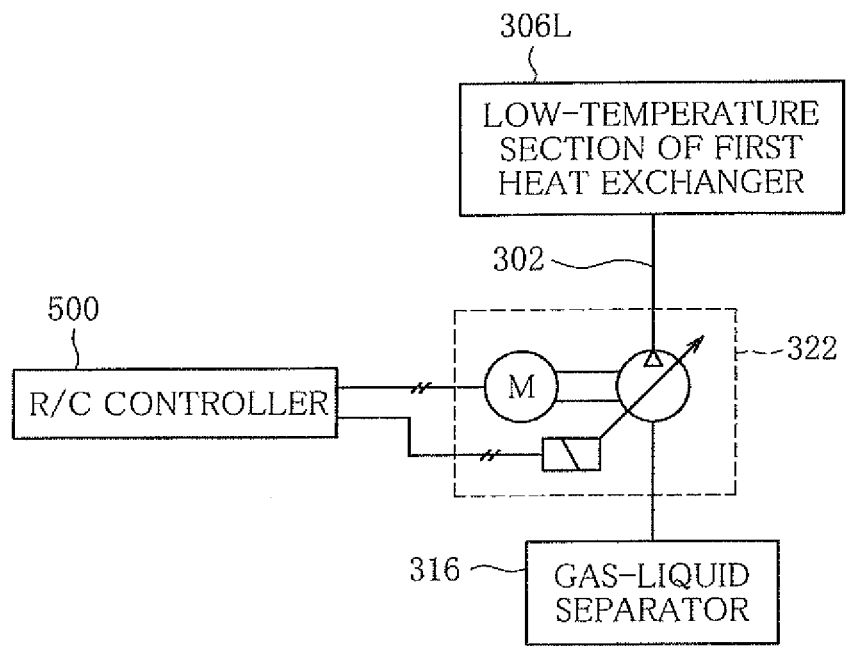
FIG. 11 is a schematic view of a heat-medium pump according to a modification example.

In the one embodiment, the R/C controller 500 preferably reduces the discharge amount of the heat-medium pump 304 since it is impossible to flow the heat media of an amount exceeding the capacity of the heat exchanger while the flow-rate regulating valve is regulating the flow rate of the heat media. In this case, the consumption power of the heat-medium pump 304 is reduced. For this purpose, the R/C controller 500 may adjusts the rotational frequency of the heat-medium pump 304. Alternatively, as shown in FIG. 11, a variable displacement pump 322 may be utilized as the heat-medium pump.

Figure 12:
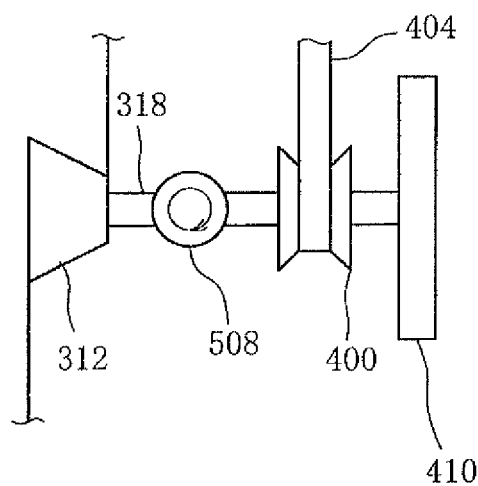
FIG. 12 is a schematic view of power-transmitting means according to a modification example.
Figure 13:
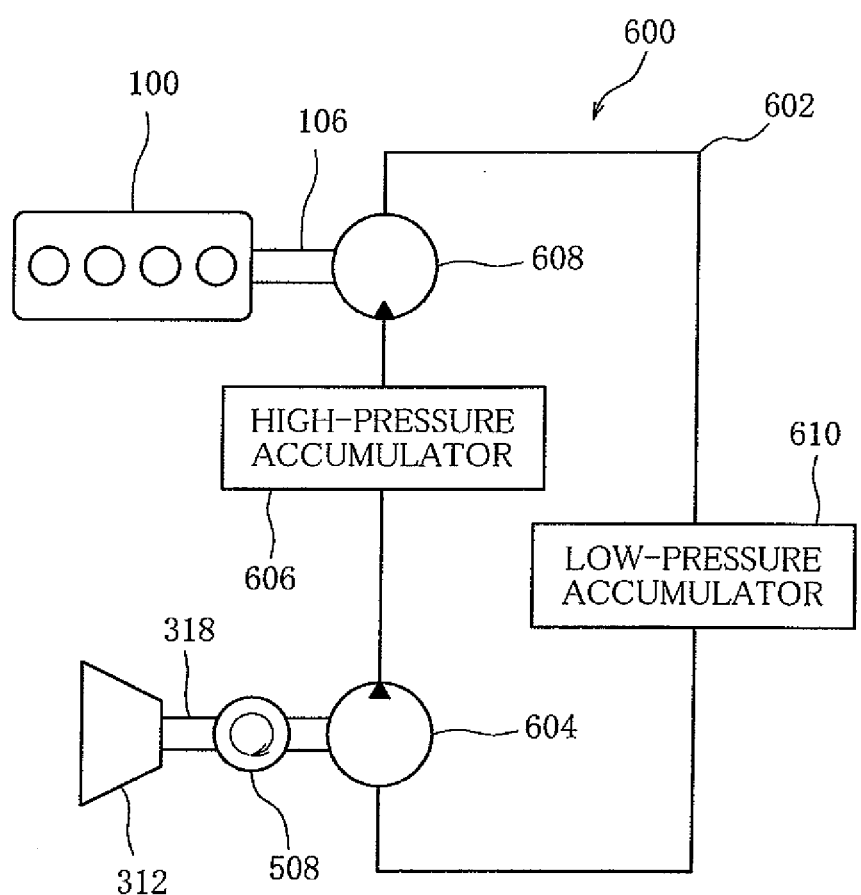
FIG. 13 is a schematic view of power-transmitting means according to a modification example.

In the one embodiment, the power-transmitting means preferably includes a flywheel 410 as shown in FIG. 12. In this case, the flywheel 410 averages the power transmitted to the rotary shaft 106 of the internal combustion engine 100, thereby stabilizing the internal combustion engine speed. In the one embodiment, the power-transmitting means preferably includes a hydraulic power unit 600. As shown in FIG. 13, the hydraulic power unit 600 has an oil circulation path 602 through which oil is circulated. In the oil circulation path 602, a hydraulic pump 604, a high-pressure accumulator 606, a hydraulic motor 608 and a low-pressure accumulator 610 are interposed in the order named in an oil circulating direction. The hydraulic pump 604 is driven by the rotary shaft 318 of the expander 312. The hydraulic motor 608 supplies power to the rotary shaft 106 of the internal combustion engine 100 by using hydraulic pressure.

Figure 14:
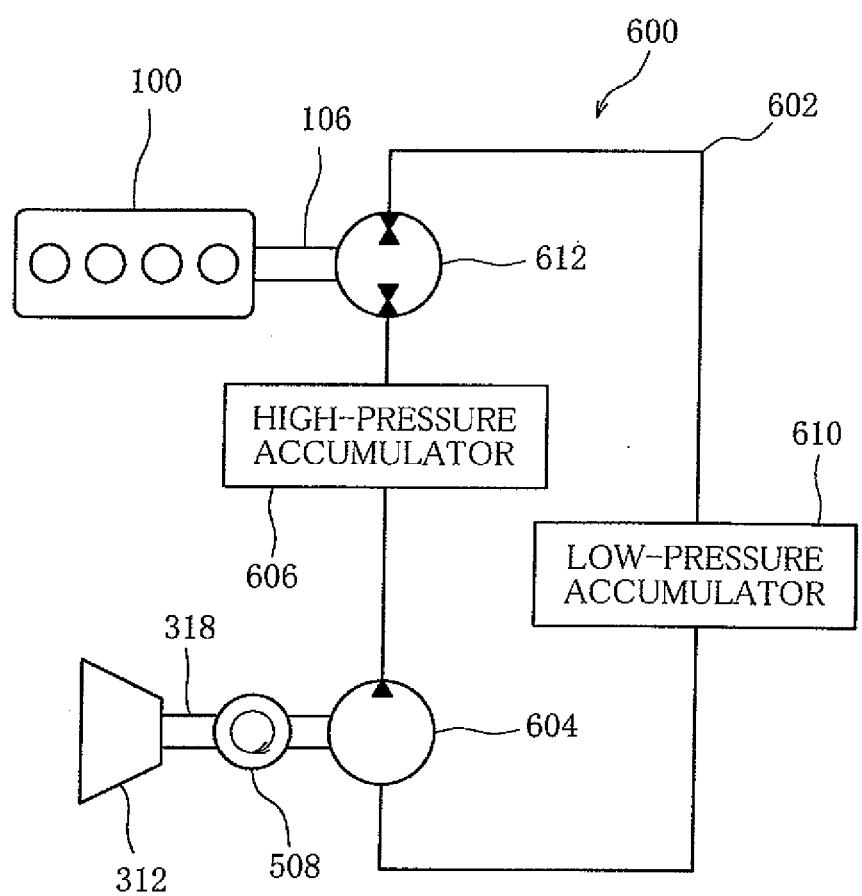
FIG. 14 is a schematic view of power-transmitting means according to a modification example.

In this case, the power transmitted to the rotary shaft 106 of the internal combustion engine 100 is averaged by the hydraulic power unit 600, thereby stabilizing the internal combustion engine speed. In the hydraulic power unit 600, not only the hydraulic motor 608 but also a hydraulic pump may be applied to the internal combustion engine 100. As shown in FIG. 14, it is also possible to apply a hydraulic motor/pump 612 in which the hydraulic motor 608 and the hydraulic pump are integrally formed. The hydraulic motor/pump 612 is a fluid machine that is capable of switching between a motor function and a pump function in response to external control.

In this case, the hydraulic motor/pump 612 is made to act as a pump while the internal combustion engine 100 is exerting a braking force. When the hydraulic motor/pump 612 functions as a pump, oil flows in a reverse direction, and the hydraulic motor/pump 612 raises the hydraulic pressure stored in the high-pressure accumulator 606 while providing the internal combustion engine 100 with load required for exertion of the braking force. Hydraulic pressure is stored in the high-pressure accumulator 606 while the internal combustion engine 100 is exerting a braking force, so that the regenerative energy amount is further increased.

In the one embodiment, the R/C controller 500 preferably stops the fan 319 at the time of causing the flow-rate regulating valve to regulate the flow rate of the heat-transfer media. By stopping the fan 319 while the flow rate of the heat-transfer media is regulated, the regenerative energy amount is further increased. The invention is apparently suitable to vehicles, and it is also evident that the invention is applicable to other things than vehicles.

INDUSTRIAL APPLICABILITY

The invention provides a waste heat recovery system of an internal combustion engine, in which the amount of the regenerative energy transmitted to the internal combustion engine is increased with a simple mechanism. The invention therefore can be used as a waste heat recovery system of an internal combustion engine, which is suitable to a vehicle.

The invention claimed is:

1. A waste heat recovery system of an internal combustion engine, comprising:
   a Rankine cycle circuit provided with a pump, a heat exchanger that heats heat-transfer media by using heat generated in an internal combustion engine and thus adds superheat to the heat-transfer media, an expander, and a condenser, which are interposed in a circulation path of the heat-transfer media;
   power-transmitting means that transmits the power of a rotary shaft of the expander to a rotary shaft of the internal combustion engine;
   a flow-rate regulating valve that is interposed in an expander upstream section of the circulation path, which extends between the heat exchanger and an inlet of the expander, and is configured to regulate a flow rate of the heat-transfer media in the expander upstream section;
   a high-pressure sensor that detects pressure of the heat-transfer media within the heat exchanger; and
   a controller that controls the operation of the pump and the flow-rate regulating valve, wherein:
   the controller has at least determination means that makes a determination as to whether it is necessary to increase the pressure of the heat-transfer media in the heat exchanger, on the basis of the pressure detected by the high-pressure sensor;
   when the at least determination means determines that it is necessary to increase the pressure of the heat-transfer media in the heat exchanger, the flow-rate regulating valve is activated to start regulating the flow rate of the heat-transfer media while the pump remains working; and
   the flow-rate regulating valve is made to continue to regulate the flow rate of the heat-transfer media at least until the at least determination means determines that it is not necessary to increase the pressure of the heat-transfer media in the heat exchanger, and then the regulation is terminated.

2. The waste heat recovery system of an internal combustion engine according to claim 1, wherein:
   the at least determination means determines that it is necessary to increase the pressure of the heat-transfer media in the heat exchanger when the pressure detected by the high-pressure sensor is lower than a lower limit pressure, and determines that it is not necessary to increase the pressure of the heat-transfer media in the heat exchanger when the pressure detected by the high-pressure sensor is higher than an upper limit pressure.

3. The waste heat recovery system of an internal combustion engine according to claim 1, further including a low-pressure sensor that detects the pressure of the heat-transfer media at an outlet of the expander, wherein:
   if a ratio of the pressure detected by the high-pressure sensor to the pressure detected by the low-pressure sensor is a pressure ratio, the at least determination means determines that it is necessary to increase the pressure of the heat-transfer media in the heat exchanger when the pressure ratio is lower than a lower limit pressure ratio, and determines that it is not necessary to increase the pressure of the heat-transfer media in the heat exchanger when the pressure ratio is higher than an upper limit pressure ratio.

4. The waste heat recovery system of an internal combustion engine according to claim 1, further including rotational-velocity detecting means that detects a rotational velocity of the rotary shaft of the expander, wherein:

the at least determination means makes a determination as to whether it is necessary to increase the pressure of the heat-transfer media in the heat exchanger only if the rotational velocity detected by the rotational-velocity detecting means is equal to or higher than a preset rotational velocity.

5. The waste heat recovery system of an internal combustion engine according to claim 1, wherein:

the waste heat recovery system is further provided in a section of the circulation path, which extends between the heat exchanger and the flow-rate regulating valve, with a tank storing the heat-transfer media so that the heat-transfer media are freely movable in and out of the tank.

6. The waste heat recovery system of an internal combustion engine according to claim 1, including an evaporator as the heat exchanger which heats the heat-transfer media by using coolant of the internal combustion engine; and a superheater that is located downstream from the evaporator as viewed into a flowing direction of the heat-transfer media and heats the heat-transfer media by using an exhaust gas of the internal combustion engine, wherein:

the tank and the superheater are formed integrally with each other.

7. The waste heat recovery system of an internal combustion engine according to claim 1, further including a second controller that controls output of the internal combustion engine, wherein:

the second controller reduces the output when the controller terminates the regulation by the flow-rate regulating valve on the flow rate of the heat-transfer media.

8. The waste heat recovery system of an internal combustion engine according to claim 1, wherein:

the flow-rate regulating valve is a flow-rate adjusting valve that is configured to vary the flow rate in a continuous way; and when terminating the regulation by the flow-rate regulating valve on the flow rate of the heat-transfer media, the controller activates the flow-rate adjusting valve so that the flow rate is continuously increased.

9. The waste heat recovery system of an internal combustion engine according to claim 1, including a plurality of on-off valves as the flow-rate regulating valve, which are arranged in the circulation path in parallel with one another, wherein:

when terminating the regulation by the flow-rate regulating valve on the flow rate of the heat-transfer media, the controller activates the on-off valves sequentially so that the flow rate is increased by stages.

10. The waste heat recovery system of an internal combustion engine according to claim 1, wherein the controller prevents the flow-rate regulating valve from regulating the flow rate of the heat-transfer media for a predetermined period of time after activating the pump.

11. The waste heat recovery system of an internal combustion engine according to claim 1, further including bypass means that bypasses the flow-rate regulating valve.

12. The waste heat recovery system of an internal combustion engine according to claim 1, wherein the power-transmitting means includes a one-way clutch that transmits power only in a direction from the rotary shaft of the expander toward the rotary shaft of the internal combustion engine.

13. The waste heat recovery system of an internal combustion engine according to claim 1, wherein the power-transmitting means includes an electromagnetic clutch that disconnectably couples the rotary shaft of the expander and the rotary shaft of the internal combustion engine to each other; and the controller releases the coupling between the rotary shaft of the expander and the rotary shaft of the internal combustion engine, which is made by the electromagnetic clutch, while causing the flow-rate regulating valve to regulate the flow rate of the heat-transfer media.

14. The waste heat recovery system of an internal combustion engine according to claim 1, wherein once the regulation by the flow-rate regulating valve on the flow rate of the heat-transfer media is started, the controller continues the regulation while the internal combustion engine is exerting a braking force.

15. The waste heat recovery system of an internal combustion engine according to claim 1, wherein a discharge amount of the pump is variable; and while the flow-rate regulating valve is regulating the flow rate of the heat-transfer media, the controller sets to zero or reduces the discharge amount of the pump.

16. The waste heat recovery system of an internal combustion engine according to claim 1, wherein the power-transmitting means includes a flywheel.

17. The waste heat recovery system of an internal combustion engine according to claim 1, wherein the power-transmitting means includes a hydraulic power unit that converts the power of the rotary shaft of the expander into hydraulic pressure and uses the hydraulic pressure to rotate the rotary shaft of the internal combustion engine.

18. The waste heat recovery system of an internal combustion engine according to claim 17, wherein:

the hydraulic power unit includes a hydraulic pump that increases the hydraulic pressure by using the power of the rotary shaft of the expander; a hydraulic accumulator storing the hydraulic pressure; and a hydraulic motor that rotates the rotary shaft of the internal combustion engine by using the hydraulic pressure stored in the hydraulic accumulator, wherein:

while the internal combustion engine is exerting a braking force, the hydraulic power unit provides the internal combustion engine with load required to exert the braking force and simultaneously increases the hydraulic pressure stored in the hydraulic accumulator by the hydraulic motor.

19. The waste heat recovery system of an internal combustion engine according to claim 1, including a fan that is controlled by the controller to refrigerate the condenser, wherein the controller stops the fan at the time of causing the flow-rate regulating valve to regulate the flow rate of the heat-transfer media.

* * * * *